United States Patent
Shi et al.

(10) Patent No.: US 8,385,275 B2
(45) Date of Patent: Feb. 26, 2013

(54) SYSTEMS AND METHODS FOR SERVICE FLOW RETENTION IN A WIRELESS COMMUNICATION SYSTEM

(75) Inventors: Guangming Carl Shi, San Diego, CA (US); Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 12/363,731

(22) Filed: Jan. 31, 2009

(65) Prior Publication Data

US 2010/0195581 A1 Aug. 5, 2010

(51) Int. Cl.
*H04W 4/00* (2009.01)
(52) U.S. Cl. ............ 370/329; 370/432; 455/452.1; 455/466
(58) Field of Classification Search .................. None
See application file for complete search history.

(56) References Cited

U.S. PATENT DOCUMENTS

| | | | |
|---|---|---|---|
| 2007/0189201 A1* | 8/2007 | Feder et al. | 370/328 |
| 2008/0198871 A1 | 8/2008 | Shahidi et al. | |
| 2008/0304510 A1 | 12/2008 | Qu | |
| 2010/0135205 A1* | 6/2010 | Li et al. | 370/328 |

FOREIGN PATENT DOCUMENTS

WO WO2008087524 7/2008

OTHER PUBLICATIONS

IEEE Computer Society and IEEE Microwave Theory and Techniques Society: "IEEE P802.16e/D12, Oct. 2005—Part 16: Air Interference for Fixed and Mobile Broadband Wireless Access Systems; Amendment for Physical and Medium Access Control Layers for Combined Fixed and Mobile Operation in Licensed Bands," Sections: 6.3.9-6.3.10; 6.3.22, and 8.4.1-8.4.4, pp. 207-216, (Oct. 14, 2005).
International Search Report—PCT/US2010/022673—International Search Authority—European Patent Office, May 12, 2010.
Written Opinion—PCT/US2010/022673, International Search Authority, European Patent Office, May 12, 2010.

* cited by examiner

*Primary Examiner* — Jianye Wu
(74) *Attorney, Agent, or Firm* — Charles Chesney

(57) ABSTRACT

A subscriber station may determine whether a service flow between the subscriber station and a base station is retained during an idle mode of the subscriber station. The subscriber station may reactivate the service flow when the subscriber station exits the idle mode. The subscriber station may monitor whether the service flow has data activity. The subscriber station may delete the service flow if there is no data activity.

25 Claims, 8 Drawing Sheets

SYSTEMS AND METHODS FOR SERVICE FLOW RETENTION IN A WIRELESS COMMUNICATION SYSTEM

TECHNICAL FIELD

The present disclosure relates generally to communication systems. More specifically, the present disclosure relates to service flow retention in a wireless communication system.

SUMMARY

Certain embodiments provide a method for service flow retention in a wireless communication system is disclosed. The method may be implemented by a subscriber station. The method may include determining whether a service flow between the subscriber station and a base station is retained during an idle mode of the subscriber station. The method may also include reactivating the service flow when the subscriber station exits the idle mode. The method may also include monitoring whether the service flow has data activity. The method may also include deleting the service flow if there is no data activity.

Certain embodiments provide a subscriber station for service flow retention in a wireless communication system is also disclosed. The subscriber station may include a processor. The subscriber station may also include memory in electronic communication with the processor. The subscriber station may also include instructions stored in the memory. The instructions may be executable by the processor to determine whether a service flow between the subscriber station and a base station is retained during an idle mode of the subscriber station. The instructions may also be executable to reactivate the service flow when the subscriber station exits the idle mode. The instructions may also be executable to monitor whether the service flow has data activity. The instructions may further be executable to delete the service flow if there is no data activity.

Certain embodiments provide a subscriber station for service flow retention in a wireless communication system is also disclosed. The subscriber station may include means for determining whether a service flow between the subscriber station and a base station is retained during an idle mode of the subscriber station. The subscriber station may also include means for reactivating the service flow when the subscriber station exits the idle mode. The subscriber station may also include means for monitoring whether the service flow has data activity. The subscriber station may also include means for deleting the service flow if there is no data activity.

Certain embodiments provide a computer-program product for service flow retention in a wireless communication system is also disclosed. The computer-program product may include a computer-readable medium having instructions thereon. The instructions may include code for determining whether a service flow between the subscriber station and a base station is retained during an idle mode of the subscriber station. The instructions may also include code for reactivating the service flow when the subscriber station exits the idle mode. The instructions may also include code for monitoring whether the service flow has data activity. The instructions may also include code for deleting the service flow if there is no data activity.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Wireless communication systems have become an important means by which many people worldwide have come to communicate. A wireless communication system may provide communication for a number of subscriber stations, each of which may be serviced by a base station. As used herein, the term "subscriber station" refers to an electronic device that may be used for voice and/or data communication over a wireless communication system. Examples of subscriber stations include cellular phones, personal digital assistants (PDAs), handheld devices, wireless modems, laptop computers, personal computers, etc. A subscriber station may alternatively be referred to as an access terminal, a mobile terminal, a mobile station, a remote station, a user terminal, a terminal, a subscriber unit, a mobile device, a wireless device, user equipment, or some other similar terminology. The term "base station" refers to a wireless communication station that is installed at a fixed location and used to communicate with subscriber stations. A base station may alternatively be referred to as an access point, a Node B, an evolved Node B, or some other similar terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication system (e.g., bandwidth and transmit power) may be shared among multiple subscriber stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

The techniques described herein may be implemented in WiMAX networks. The term "WiMAX" refers to a family of standards that is prepared by the Institute of Electronic and Electrical Engineers (IEEE) 802.16 Working Group on Broadband Wireless Access Standards. Thus, the term "WiMAX network" refers to a wireless communication network that is configured in accordance with one or more WiMAX standards.

WiMAX standards support the retention of certain information when a mobile station enters idle mode. For example, an Idle Mode Retain Information type-length-value (TLV) element may be included in deregistration request (DREG-REQ) and deregistration command (DREG-CMD) messages. Therefore, a mobile station may retain different areas of mobile station context in idle mode. One area of mobile station context is service flow information, including service flow identification, service flow parameters, and classifier rules.

Figure 1:
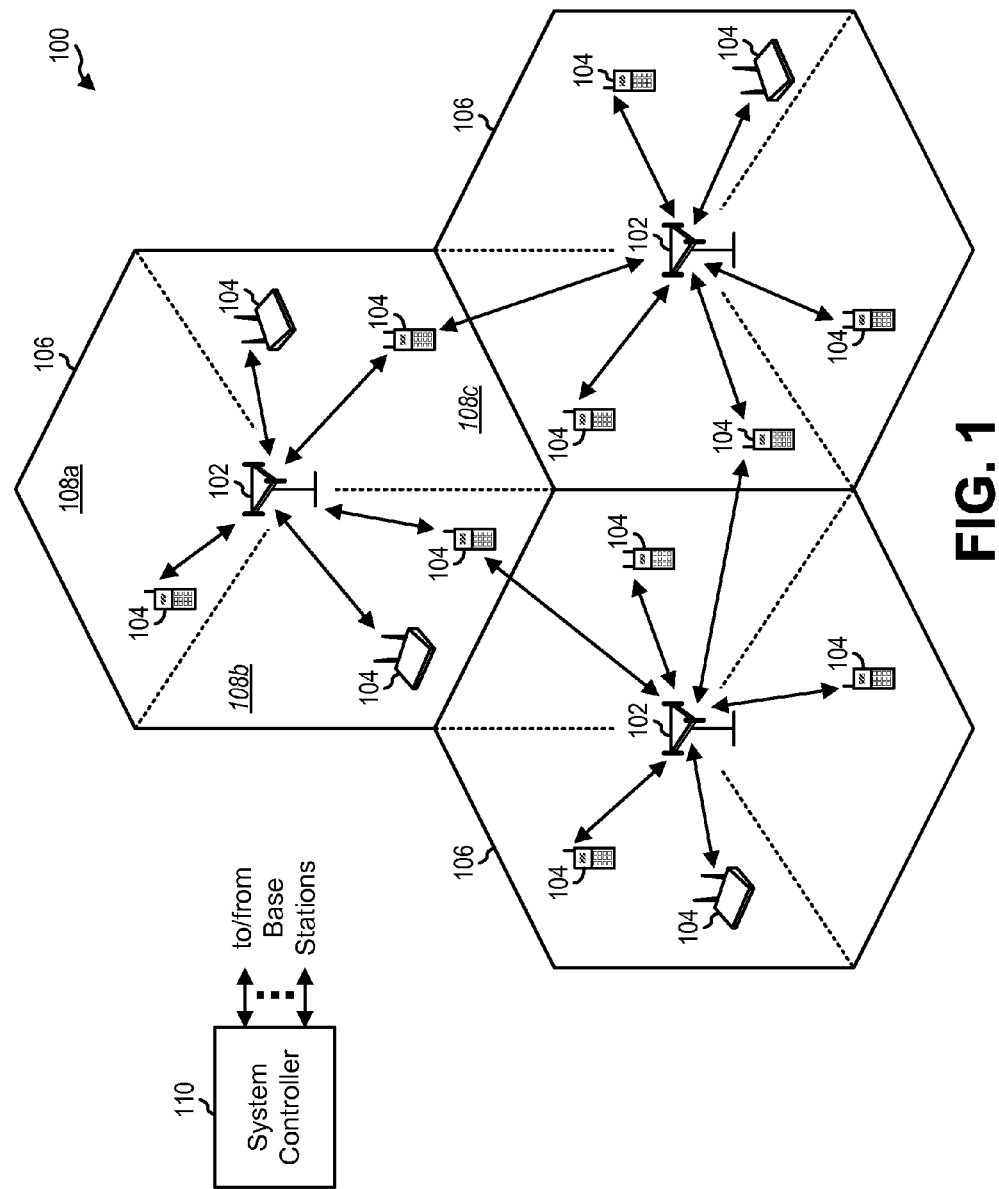
FIG. 1 shows an example of a wireless communication system in which the methods disclosed herein may be utilized.

FIG. 1 shows an example of a wireless communication system 100 in which the methods disclosed herein may be utilized. The wireless communication system 100 includes multiple base stations (BS) 102 and multiple subscriber stations (SS) 104. Each base station 102 provides communication coverage for a particular geographic area 106. The term "cell" can refer to a base station 102 and/or its coverage area 106 depending on the context in which the term is used.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Subscriber stations 104 are typically dispersed throughout the system 100. A subscriber station 104 may communicate with zero, one, or multiple base stations 104 on the downlink and/or uplink at any given moment.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

Figure 2:
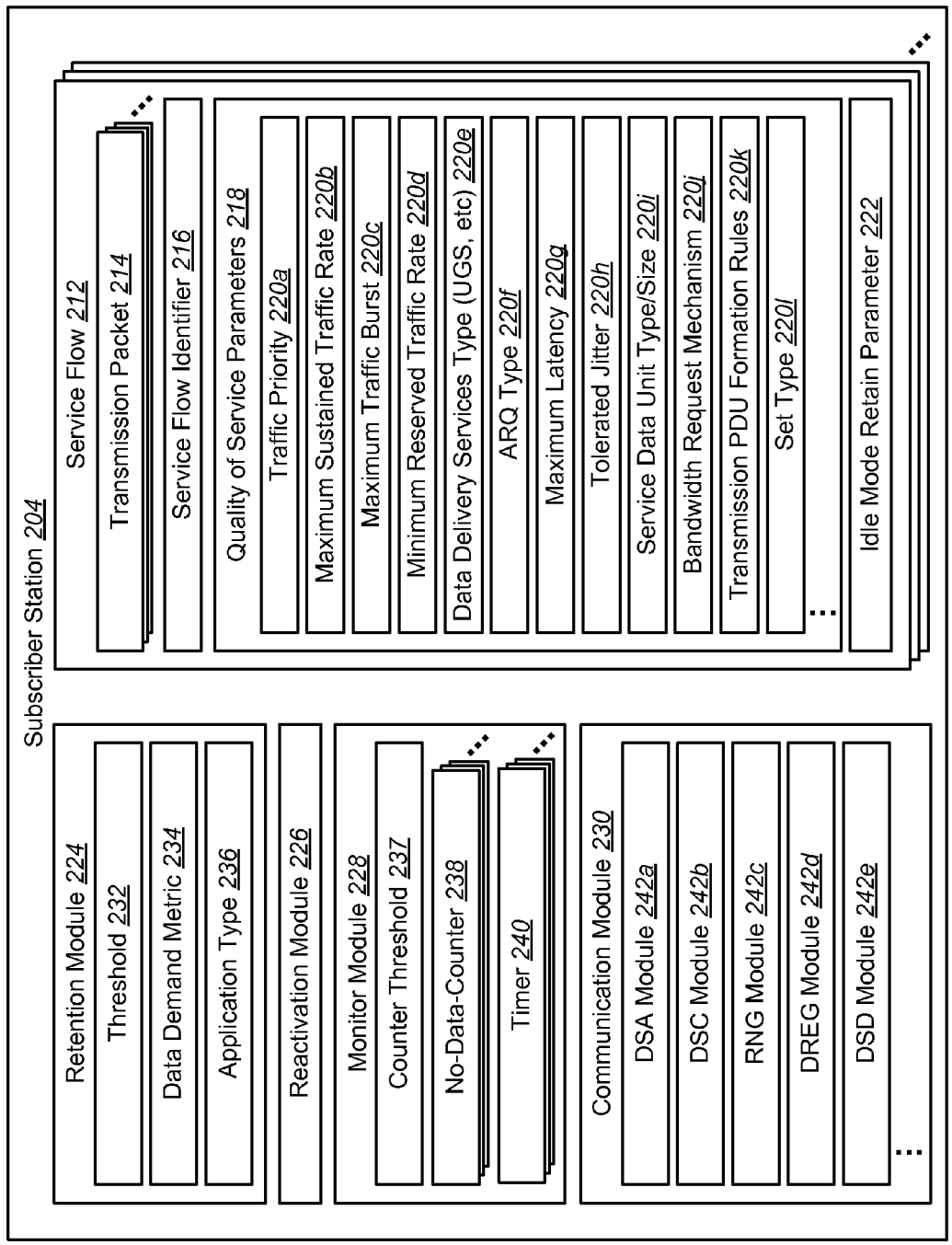
FIG. 2 is a block diagram illustrating a subscriber station for retaining a service flow in a wireless communication system.

FIG. 2 is a block diagram illustrating a subscriber station 204 for retaining a service flow 212 in a wireless communication system. As used herein, the phrase "retaining service flow(s)" and its variants refers to the process of storing any information about the service flow(s) 212 on the subscriber station 204, the base station 102, or both. The subscriber station 204 may communicate with a base station 102 wirelessly. One possible standard the subscriber station 204 may use to communicate with the base station 102 is a WiMAX standard. In WiMAX, a subscriber station 204 may send data to a base station 102 using a service flow 212, and vice versa.

Additional information about service flows 212 in the context of a WiMAX network will now be provided. In a WiMAX network, a service flow 212 is a unidirectional flow of packets 214 with a particular set of Quality of Service (QoS) parameters 218 and is identified by a service flow identifier (SFID) 216. The transmission packets 214 may be MAC protocol data units (MPDU). MPDUs may be the data units used by the MAC layer in WiMAX for transmission over the air. In other words, the MAC layer may receive packets from upper layers and organize them into MPDUs for efficient over-the-air transmission. The QoS parameters 218 may include traffic priority 220a, maximum sustained traffic rate 220b, maximum traffic burst 220c, minimum reserved traffic rate 220d, data delivery services type 220e, ARQ type 220f, maximum latency 220g, tolerated jitter 220h, service data unit type and size 220i, bandwidth request mechanism to be used 220j, transmission PDU formation rules 220k, etc. Service flows 212 may be provisioned through a network management system or created dynamically through signaling mechanisms that are defined in WiMAX standards.

The different types of data delivery services with corresponding types of service flows 212 include unsolicited grant services (UGS) service flows 212, extended-real-time variable rate (ERT-VR) service flows 212, real-time variable rate (RT-VR) service flows 212, non-real-time variable rate (NRT-VR) service flows 212, and best effort (BE) service flows 212. The UGS, ERT-VR, RT-VR, NRT-VR, and BE service flows 212 are currently defined in WiMAX standards. The data delivery services type 220e may indicate the type of service flow 212, e.g., UGS, ERT-VR, RT-VR, etc.

The UGS service flows 212 are designed to support fixed-size data packets 214 at a constant bit rate. Examples of applications that may use this service are T1/E1 emulation and voice-over-IP (VoIP) without silence suppression. The ERT-VR service flows 212 are designed to support real-time applications, such as VoIP with silence suppression, that have variable data rates but require guaranteed data rate and delay. The RT-VR service flows 212 are designed to support real-time service flows 212, such as MPEG video, that generate variable-size data packets on a periodic basis. The NRT-VR service flows 212 are designed to support delay-tolerant data streams, such as FTP, that require variable-size data grants at a minimum guaranteed rate. The BE service flows 212 are designed to support data streams, such as Web browsing, that do not require a minimum service-level guarantee.

In addition to using service flow types defined in the WiMAX standards, the subscriber station 204 may communicate with a base station 102 using a new type of service flow that is not currently defined in WiMAX standards. New service flow types may be defined by one or more QoS parameters 218.

The subscriber station 204 may include a retention module 224, a reactivation module 226, a monitor module 228, and a communication module 230. The retention module 224 may decide which service flows 212, if any, will be retained before the subscriber station 204 enters an idle mode. As used herein, the term "idle mode" refers to a device state that allows the subscriber station 204 to completely turn off and to not be registered with any base station 102 while still receiving downlink broadcast traffic. When downlink traffic arrives for the idle-mode subscriber station 204, the subscriber station 204 may be paged by a collection of base stations 102 that form a paging group. The subscriber station 204 may be assigned to a paging group by the base station 102 before going into idle mode, and the subscriber station 204 may periodically wake up to update its paging group. Idle mode may save more power than sleep mode, since the subscriber station 204 does not register or do handoffs while in idle mode.

Before entering idle mode, the retention module 224 may determine whether a service flow 212 should be retained or not. This may include using one or more of the following configurations. In one configuration, an idle mode retain parameter 222 may be added to each service flow 212. This parameter 222 may explicitly indicate whether a service flow 212 should be retained when the subscriber station 204 enters idle mode. This may include adding the idle mode retain parameter 222 using Dynamic Service Flow Addition (DSA) or Dynamic Service Flow Change (DSC) messages.

Alternatively, the decision whether to retain a service flow 212 or not may depend on the data delivery services type 220e, and another QoS parameter 218, e.g., maximum latency 220g. For example, if the service flow 212 is UGS (Unsolicited Grant Service), RT-VR (Real-Time Variable Rate), or ERT-VR (Extended-Real-Time Variable Rate), then the service flow 212 may be retained. Or, if the maximum latency 220g is smaller than some threshold 232, then the service flow 212 may be retained. Note that many configurations of QoS parameters 218 may be used in this determination.

Alternatively, the decision whether to retain a service flow 212 or not may depend on the recurrence of the data demand. This may include using a data demand metric 234. For example, if the data demand between the subscriber station 204 and the base station 102 is expected to resume in a short time, then the service flow 212 may be retained. However, if the data demand is not expected to resume in a short time, then the service flow 212 may not be retained. Therefore, the data demand metric 234 may be any data that indicates the likelihood that data demand for a service flow 212 will or will not resume within a particular amount of time.

Alternatively, the decision whether to retain a service flow 212 or not may depend on the application for which the service flow 212 is being used. For example, data demand for email, web browsing, and voice over internet protocol (VoIP) applications may not be able to resume data transmission in a short amount of time, and therefore, service flows 212 used by these applications may not be retained. However, push-to-talk applications may capable of resuming data transmission in a short amount of time. Therefore, a service flow 212 used by a push-to-talk application may be retained. Information about the application for which the service flow 212 is being used may be stored in an application type parameter 236 in the retention module 224 or elsewhere on the subscriber station 204.

If the retention module 224 determines that a service flow 212 will not be retained, the subscriber station 204 may delete this service flow 212 using Dynamic Service Flow Deletion (DSD) before entering the idle mode. By not retaining some service flows 212, the subscriber station 204 may save costs associated with memory on the subscriber station 204, the base station 102, or both.

The subscriber station 204 may also include a reactivation module 226 that may reactivate retained service flows 212 when the subscriber station 204 exits the idle mode. When the subscriber station 204 exits idle mode, the reactivation module 226 may request verification of the retained service flow 212 from the base station 102. For example, the request verification may be included in a ranging request message (RNG-REQ) to the base station 102. Furthermore, this verification may include the admission control in the base station 102 determining if there is enough available bandwidth to support the service flow 212. The decision from the base station 102 may be included in a ranging response message (RNG-RSP). If a retained service flow 212 is admitted, the reactivation module 226 may change the set type QoS parameter 220l to admitted and active. However, even if the admission control of the base station 102 verifies, or admits, a retained service flow 212, the subscriber station 204 may decide not to reactivate, and instead use a DSC message to change the set type 220l to provisioned. If a retained service flow 212 is not verified, or admitted, by the base station 102, the reactivation module 226 may change the set type parameter 220l to provisioned. Furthermore, a subscriber station 204 may renegotiate service flow 212 activation or deactivation with DSC messages even if the base station 102 does not verify, or admit, a retained service flow 212.

The subscriber station 204 may also include a monitor module 228 that may monitor retained service flows 212 to ensure that service flows 212 without data activity will no longer be retained. This monitoring may include using one of two configurations. In one configuration, the subscriber station 204 may monitor a service flow 212 to be retained. A no-data-counter 238 may be initialized to zero when each service flow 212 is created. This may include the monitor module 228 monitoring if there is any data transmission for a service flow 212 to be retained during normal mode. If there is no data transmission for the service flow 212 before the next idle mode session, the no-data-counter 238 may be incremented. However, the no-data counter 238 may be reset to zero if there is data transmission for the service flow 212 during the normal mode duration. Subsequently, whenever a retained service flow 212 is reactivated upon the subscriber station 204 exiting idle mode and the no-data-counter 238 is greater than or equal to a counter threshold 237, the subscriber station 204 may enter a monitoring period during which the subscriber station 204 may monitor the service flow 212 for data activity. If there is no data activity for a service flow 212 for a predetermined period of time during the monitoring period, the subscriber station 204 may delete the service flow 212 and no longer retain the service flow 212 during idle modes.

In another configuration, the monitor module 228 may utilize a timer 240 to ensure that service flows 212 without data activity will no longer be retained. In this configuration, the monitor module 228 may initialize a timer 240 for each service flow 212 created regardless of the state of the subscriber station 204, e.g., idle mode or normal mode. As long as there is no data activity on a service flow 212, the timer 240 may continue to run. However, the timer 240 may be reset to zero if data activity occurs on the service flow 212. Then, if the timer 240 exceeds a predetermined period of time, the service flow 212 may be deleted. If the subscriber station 204 is in normal mode when the timer 240 exceeds the predetermined period of time, the service flow 212 may be deleted immediately and the service flow 212 may no longer be retained. If, however, the subscriber station 204 is in idle mode when the timer 240 exceeds the predetermined period of time, the monitor module 228 may wait for the subscriber station 204 to enter normal mode before deleting the service flow 212.

The subscriber station 204 may also include a communication module 230 capable of creating and processing a variety of types of messages used with the present systems and methods. For example, the DSA module 242a may be capable of creating Dynamic Service Flow Addition (DSA) messages. Likewise, the DSC module 242b, RNG module 242c, DREG module 242d, and DSD module 242e may be capable of creating Dynamic Service Flow Change (DSC), ranging (RNG), deregistration (DREG), and Dynamic Service Deletion (DSD) messages, respectively. The communication module 230 may also include other modules that create and process other types of messages supported in the WiMAX standards.

Figure 3:
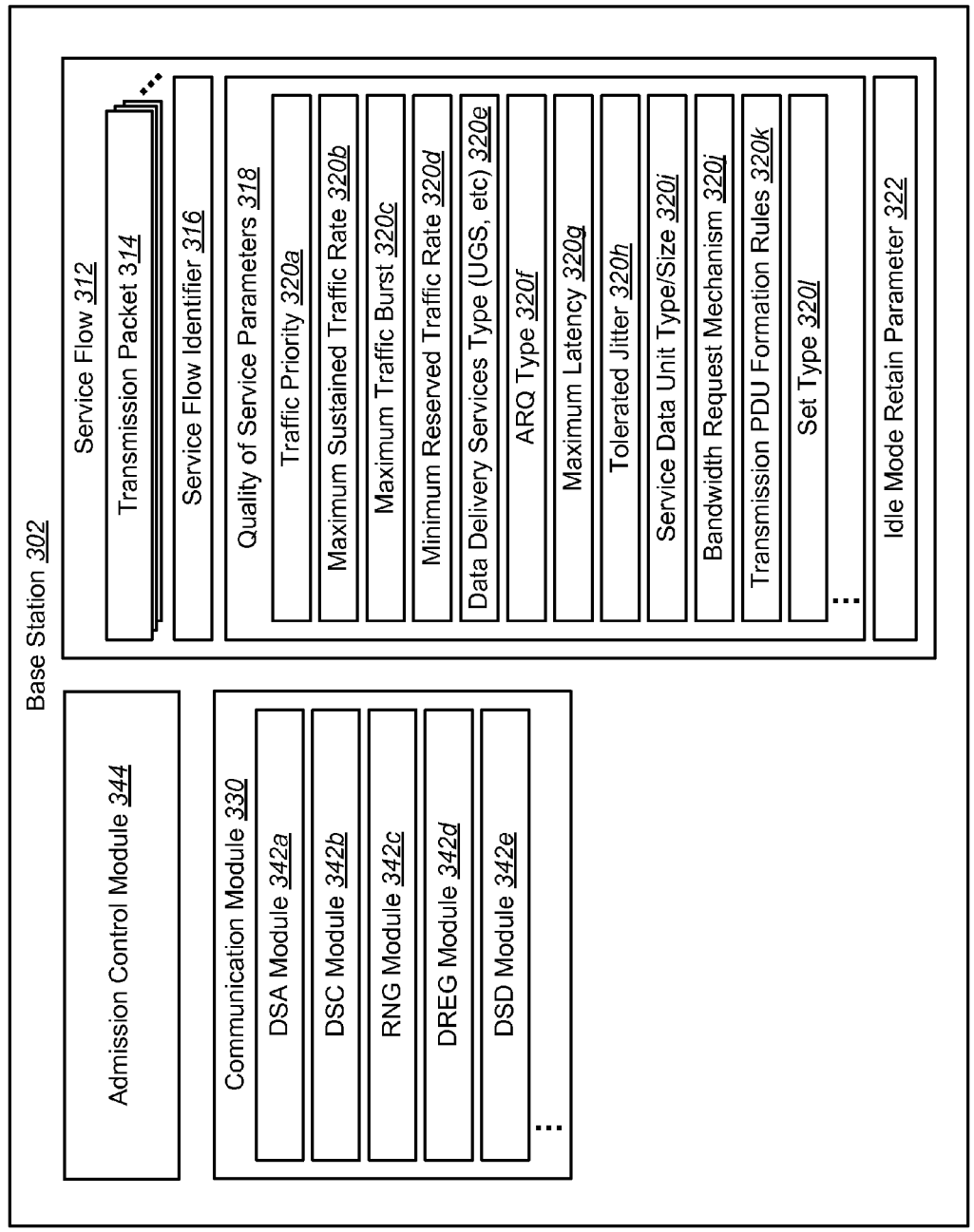
FIG. 3 is a block diagram illustrating a base station for retaining a service flow in a wireless communication system.

FIG. 3 is a block diagram illustrating a base station 302 for retaining a service flow 312 in a wireless communication system. The base station 302 may communicate with a subscriber station 204 wirelessly, e.g., using a WiMAX standard. The base station 302 may use service flows 312 to transmit to or receive packets 314 from the subscriber station 204. As before, the service flow 312 is a unidirectional flow of packets 314 with a particular set of QoS parameters 318 and is identified by a service flow identifier (SFID) 316. The transmission packets 314 may be MAC protocol data units (MPDU). The QoS parameters 318 may include traffic priority 320a, maximum sustained traffic rate 320b, maximum traffic burst 320c, minimum reserved traffic rate 320d, data delivery services type 320e, ARQ type 320f, maximum latency 320g, tolerated jitter 320h, service data unit type and size 320i, bandwidth request mechanism to be used 320j, transmission PDU formation rules 320k, set type 3201, etc. Furthermore, the service flow 312 may include an idle mode retain parameter 322 that explicitly indicates whether the service flow 312 should be retained when the subscriber station 204 enters idle mode.

The base station 302 may also include an admission control module 344 that may verify a retained service flow 312. In other words, the admission control module 344 may determine whether to admit a service flow 312 upon the subscriber station 204 exiting idle mode. This may include the admission control module 344 receiving a ranging request message (RNG-REQ) from the subscriber station 204, determining whether there is enough available bandwidth to support the retained service flow 312, and responding to the subscriber station 204 in a ranging response message (RNG-RSP). Specifically, the verification decision may be included in the QoS parameters type-length-value (TLV) element of the RNG-RSP message.

The base station 302 may also include a communication module 330 capable of creating and processing a variety of types of messages used with the present systems and methods. For example, the DSA module 342a may be capable of creating Dynamic Service Flow Addition (DSA) messages. Likewise, the DSC module 342b, RNG module 342c, DREG module 342d, and DSD module 342e may be capable of creating Dynamic Service Flow Change (DSC), ranging (RNG), deregistration (DREG), and Dynamic Service Deletion (DSD) messages, respectively. The communication module 330 may also include other modules that create and process other types of messages supported in the WiMAX standards.

Figure 4:
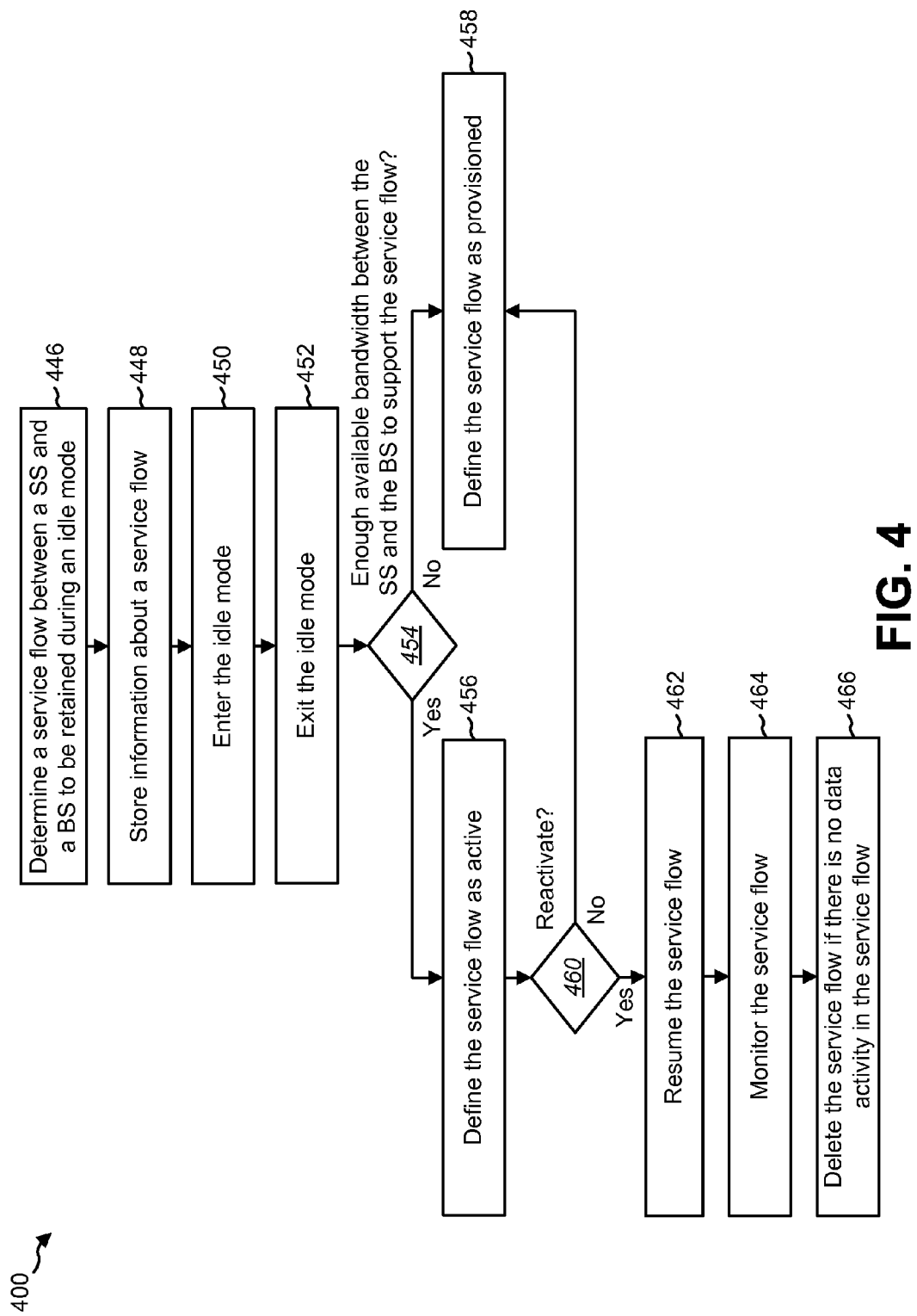
FIG. 4 is a flow diagram illustrating a method for retaining a service flow in a wireless communication system.

FIG. 4 is a flow diagram illustrating a method 400 for retaining a service flow 212 in a wireless communication system. The method 400 may be performed in a subscriber station 204, a base station 302, or both. First, a service flow 212 between a subscriber station 204 and a base station 302 that is to be retained during an idle mode is determined 446. This may include any of the configurations described above. In other words, the decision about whether to retain the service flow 212 may be based on any of the following: an idle mode retain parameter 222; the data delivery services type 220e and another QoS parameter 218 e.g., maximum latency 220g; the recurrence of the data demand indicated by a data demand metric 234; the application for which the service flow 212 is being used indicated by an application type 236; and so forth.

Information about the service flow 212 may then be stored 448. This may include storing service flow 212 information on the subscriber station 204, the base station 302, or both. This may include the service flow identifier (SFID) 216, some or all of the QoS parameters 218, and classifier rules. In one configuration, the information stored includes the QoS parameters, such as traffic priority 320a, maximum sustained traffic rate 320b, maximum traffic burst 320c, minimum reserved traffic rate 320d, data delivery services type 320e, ARQ type 320f, maximum latency 320g, tolerated jitter 320h, and service data unit type/size 320i. Additionally, the convergence sublayer (CS) parameters, such as the CS specification may be stored, e.g., Internet Protocol version 4 (IPv4), Internet Protocol version 6 (IPv6), Ethernet, or Automated Transfer Mode (ATM). Likewise, the classification rules parameters may be stored, e.g., IP masked source address, IP masked destination address, protocol source port range, protocol destination port range, etc. This information may be used by the subscriber station 204 and the base station 302 to re-establish data activity when the subscriber station 204 exits idle mode.

Next, a subscriber station 204 may enter 450 and then exit 452 idle mode. Idle mode may be any device state that allows the subscriber station 204 to reduce power consumption and to not be registered with any base station 302 while still receiving downlink broadcast traffic. Upon exiting 452 idle mode, it may be verified 454 whether there is available bandwidth between the subscriber station 204 and the base station 302 to support the service flow 212. This may include a subscriber station 204 sending a ranging request message (RNG-REQ) to the base station 302. This verification 454 may further include the admission control module 344 in the base station 302 determining if there is enough available bandwidth to support the service flow 212 and sending a ranging response message (RNG-RSP) to the subscriber station 204 with the decision.

If the service flow 212 is admitted by the admission control module 344, the subscriber station 204 may define 456 the set type QoS parameter 2201 for the service flow 212 as admitted and active. If the service flow 212 is not admitted by the admission control module 344, the subscriber station 204 may define 458 the set type QoS parameter 220l as provisioned.

However, even if the admission control module 344 of the base station 302 verifies/admits the service flow 212, the subscriber station 204 may determine 460 whether to reactivate the service flow 212. If the subscriber station 204 determines 460 that the service flow 212 should not be reactivated, the subscriber station 204 may define 458 the set type QoS parameter 220l as provisioned. If, however, the subscriber station 204 determines 460 that the service flow 212 should be reactivated, the service flow 212 data activity may resume 462. The subscriber station 204 may monitor 464 the service flow 212 to ensure that service flows 212 without data activity will no longer be retained. This may include monitoring the data activity of the service flow 212 using either of the configurations described above, e.g., a no-data counter 238 or a timer 240. If the service flow 212 does not have data activity, the subscriber station 204 may delete 466 it.

Figure 5:
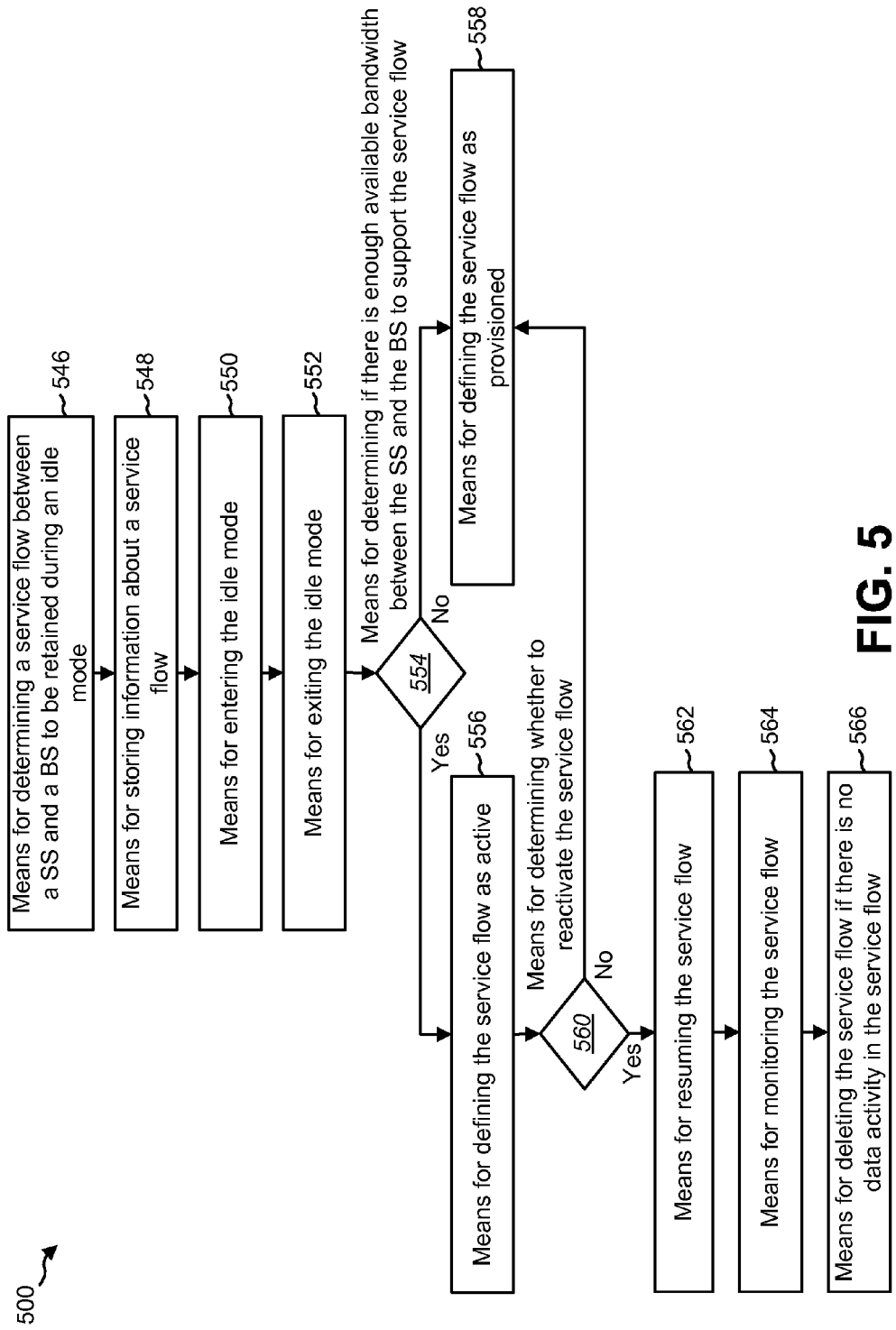
FIG. 5 is a flow diagram illustrating means-plus-function blocks corresponding to the method shown in FIG. 4.

The method 400 of FIG. 4 described above may be performed by various hardware and/or software component(s) and/or module(s) corresponding to the means-plus-function blocks 500 illustrated in FIG. 5. In other words, blocks 446 through 466 illustrated in FIG. 4 correspond to means-plus-function blocks 546 through 566 illustrated in FIG. 5.

Figure 6:
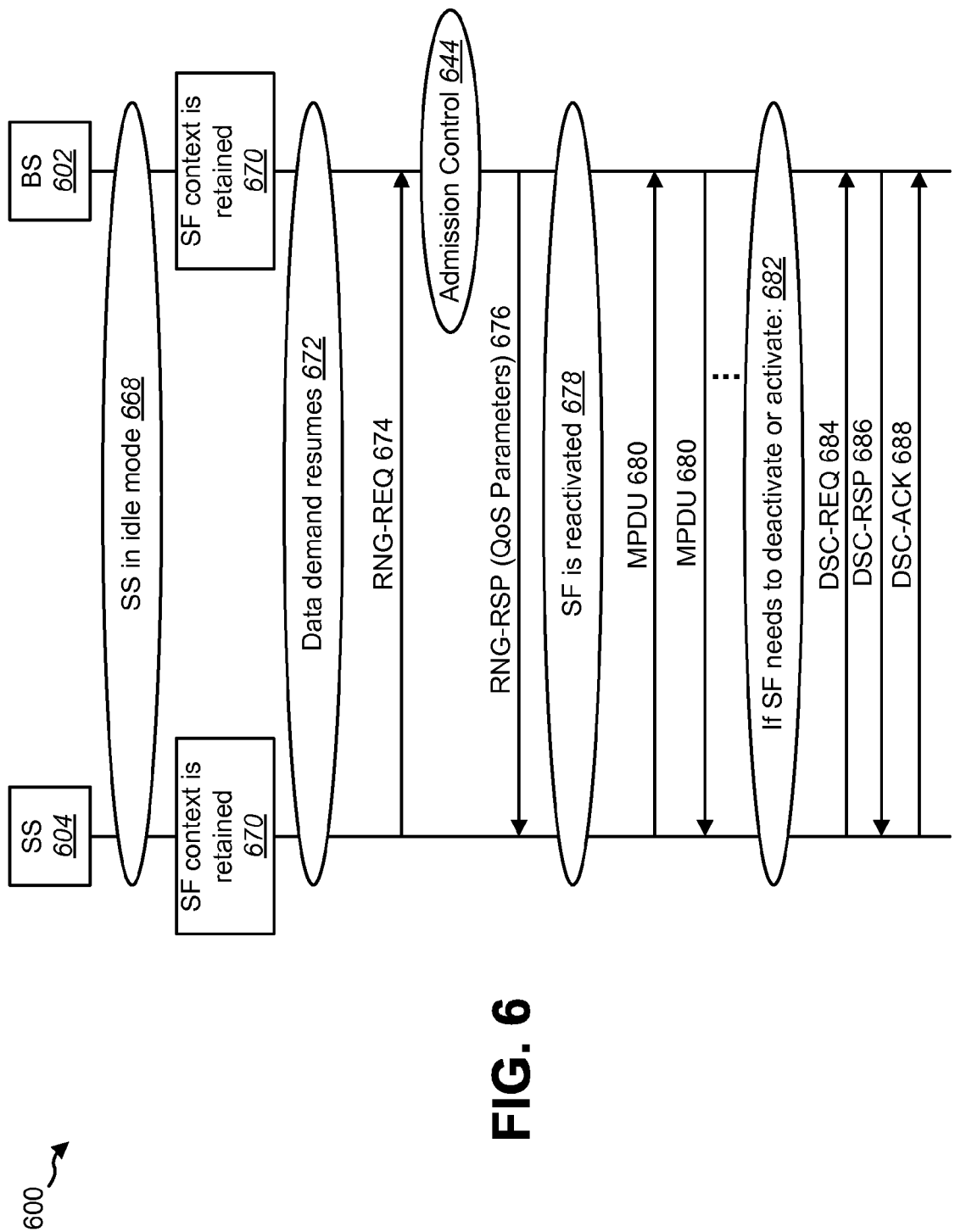
FIG. 6 is a sequence diagram of a method for reactivating a service flow.

FIG. 6 is a sequence diagram of a method 600 for reactivating a service flow 212. The method 600 involves a subscriber station 604 and a base station 602. The method 600 may be considered to be a more detailed description of steps 450 through 462 in the method 400 illustrated in FIG. 4.

First, a subscriber station 604 may enter 668 idle mode. At this time, information about one or more service flows may be retained 670 on the subscriber station 604 and the base station 602. This information may include a service flow identifier (SFID) 216, some or all of the QoS parameters 218, and classifier rules. Then, as the subscriber station 604 exits idle mode, the data demand in the service flow 212 may resume 672. The subscriber station 604 may then send 674 a RNG-REQ message to the base station 602, and admission control may be performed 644. The RNG-REQ message may be a request that the base station 602 determine whether there is enough available bandwidth between the subscriber station 604 and the base station 602. The base station 602 may respond with a decision about the bandwidth, e.g., the decision may be included in the QoS parameters 218 of a ranging response message (RNG-RSP) that is sent 676 to the subscriber station 604.

Then, if there is enough available bandwidth and the subscriber station 604 decides to reactivate 678 the service flow 212, data activity on the service flow 212 may resume 680. This may include the exchange of transmission packets 214 that may be in the form of MAC protocol data units (MPDU). However, even if the base station 602 verifies the available bandwidth for the service flow 212, the subscriber station 604 may independently choose to deactivate 682 the service flow. Similarly, even if the base station 602 fails to verify the available bandwidth for the service flow 212, the subscriber station 604 may independently begin a new activation procedure 682. If the subscriber station 604 chooses to deactivate 682 a service flow 212 or activate 682 a new service flow 212, the subscriber station 604 may transmit 684 service flow parameters with new traffic characteristics, or data delivery services requirements of a service flow 212 to be changed, to the base station 602 through a Dynamic Service Change Request (DSC-REQ) message.

After processing changes for the service flow 212 requested in the DSC-REQ, the base station may transmit 686 a Dynamic Service Change Response (DSC-RSP) message with a confirmation code, a Connection ID (CID) to be newly allocated, and QoS parameters 218. The subscriber station 604 may also transmit 688 a Dynamic Service Change Acknowledgement (DSC-ACK) message to inform the base station 602 that it has received the DSC-RSP message.

Figure 7:
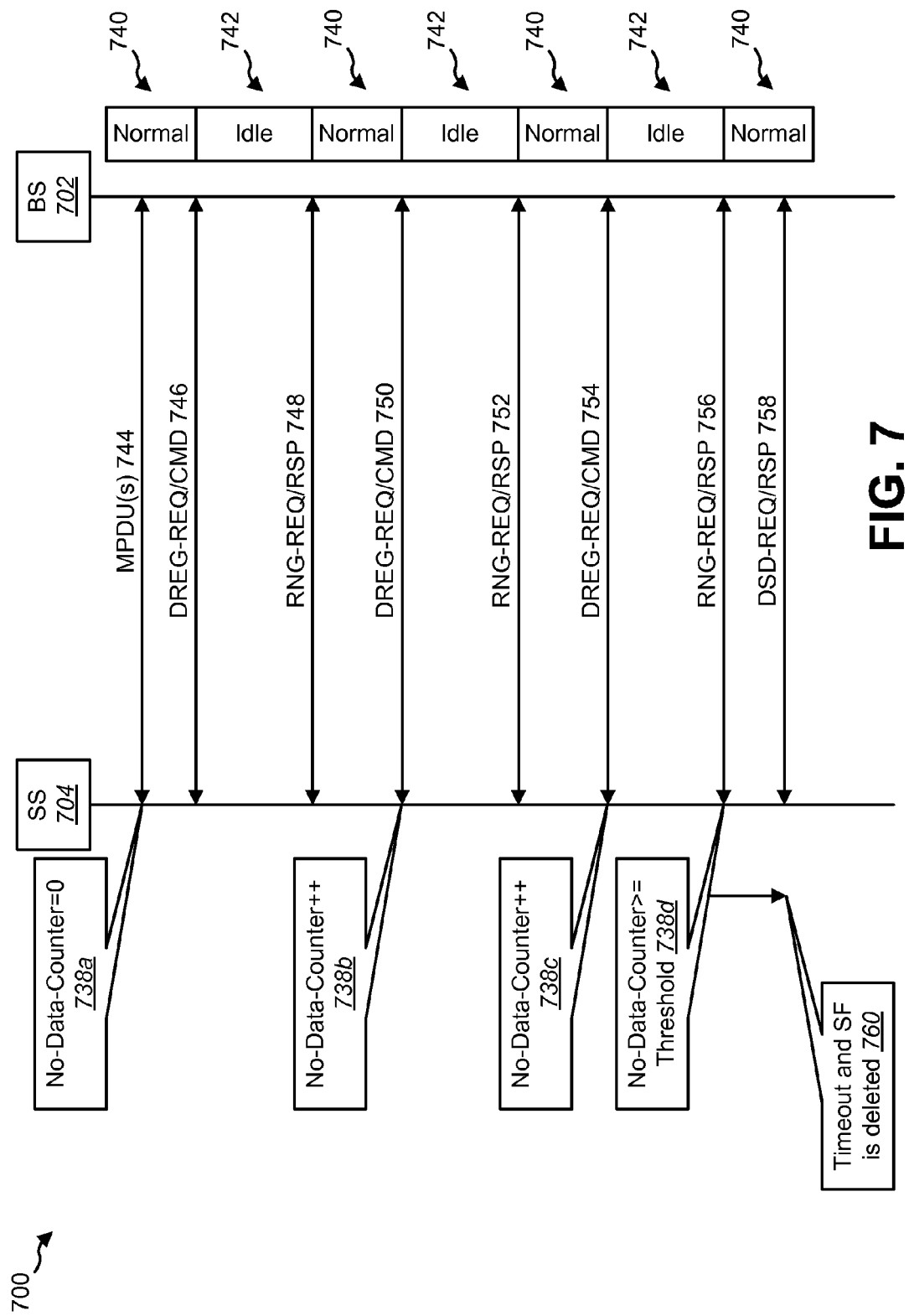
FIG. 7 is a sequence diagram illustrating a method for monitoring a retained service flow.

FIG. 7 is a sequence diagram illustrating a method 700 for monitoring a retained service flow 212. The method 700 may involve a subscriber station 704 and a base station 702. The method 700 may further describe the configuration for monitoring using a no-data-counter 238 as described in FIG. 2.

After a retained service flow 212 has been reactivated, a no-data-counter 238 may be initialized 738a to zero. During normal mode 740, the subscriber station 704 and the base station 702 may exchange 744 transmission packet(s) 214 that may be in the form of MPDU(s). Then, before entering idle mode 742, the subscriber station 704 and the base station 702 may transmit 746 a deregistration request (DREG-REG) message and a deregistration command (DREG-CMD) message to each other, respectively. These may indicate that a service flow 212 is to be retained.

Upon exiting idle mode 742, the subscriber station 704 may send 748 a ranging request (RNG-REQ) message that requests that the base station 702 determine whether there is enough available bandwidth between the subscriber station 704 and the base station 702 to verify/admit the service flow 212. The base station 702 may respond 748 with a ranging response (RNG-RSP) that includes the decision of the base station 702. At this point, the subscriber station 704 may enter idle mode 742 again by exchanging 750 a deregistration request (DREG-REG) message and a deregistration command (DREG-CMD) message with the base station 704. If, upon re-entering idle mode 742, there has been no exchange of transmission packets 214, such as MPDUs, the no-data-counter 238 may be incremented 738b.

This may be repeated every time the subscriber station 704 exits an idle mode 742 and re-enters an idle mode 742 without any data activity. Specifically, the subscriber station 704 and the base station 702 may transmit 752 a ranging request (RNG-REQ) message and a ranging response (RNG-RSP), respectively. Then, if there has been no data activity upon the exchange 754 of a deregistration request (DREG-REG) message and a deregistration command (DREG-CMD) message, the no-data-counter 238 may be incremented 738c again.

Upon exiting idle mode 742, the subscriber station 704 and the base station 702 may again transmit 756 a ranging request (RNG-REQ) message and a ranging response (RNG-RSP), respectively. However, if the no-data-counter 238 is greater than or equal to a counter threshold 237 and there has been no data activity for some time since exiting idle mode 742, the service flow may be deleted 760 using Dynamic Service Flow Deletion (DSD) 758, e.g., the subscriber station 704 may send a DSD-REQ message and the base station 702 may send a DSD-RSP message.

Figure 8:
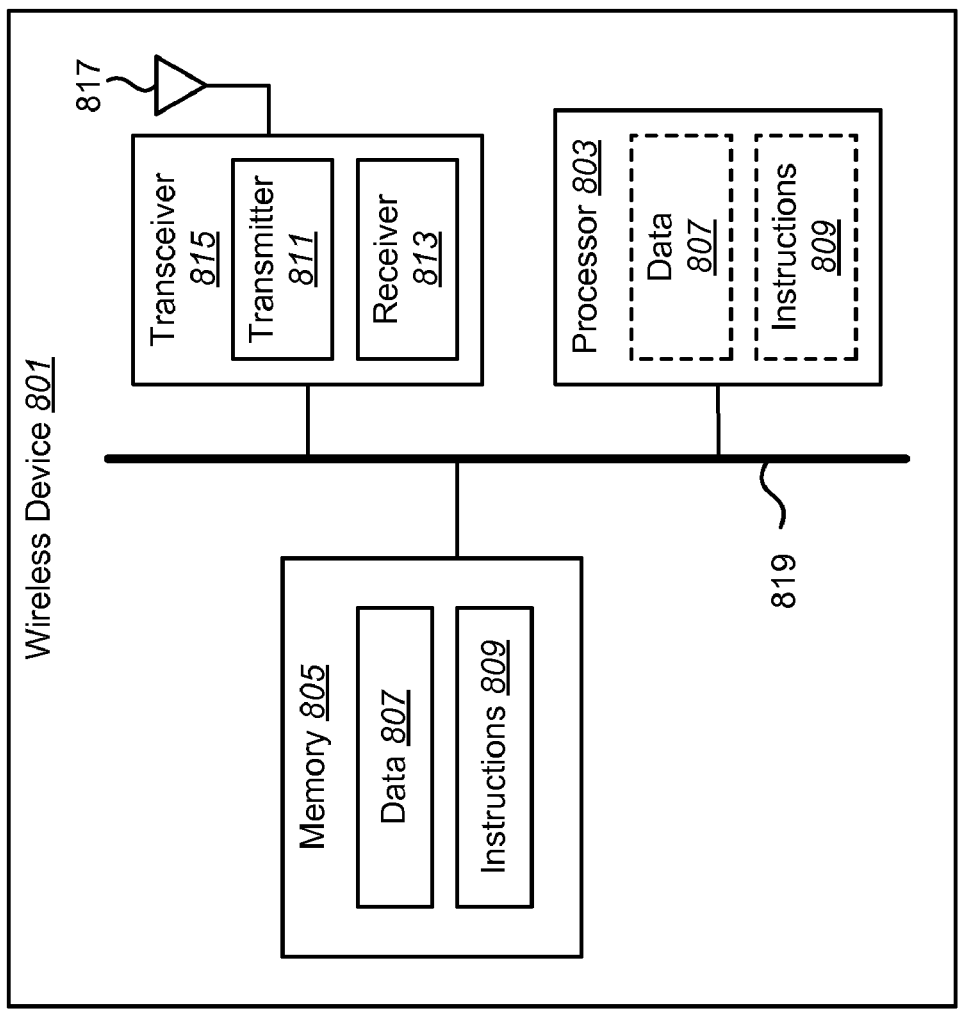
FIG. 8 illustrates certain components that may be included within a wireless device.

FIG. 8 illustrates certain components that may be included within a wireless device 801. The wireless device 801 may be a subscriber station or a base station.

The wireless device 801 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the wireless device 801 of FIG. 8, in an alternative configuration, a combination of processors (e.g., an ARM and DSP) could be used.

The wireless device 801 also includes memory 805. The memory 805 may be any electronic component capable of storing electronic information. The memory 805 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 807 and instructions 809 may be stored in the memory 805. The instructions 809 may be executable by the processor 803 to implement the methods disclosed herein. Executing the instructions 809 may involve the use of the data 807 that is stored in the memory 805.

The wireless device 801 may also include a transmitter 811 and a receiver 813 to allow transmission and reception of signals between the wireless device 801 and a remote location. The transmitter 811 and receiver 813 may be collectively referred to as a transceiver 815. An antenna 817 may be electrically coupled to the transceiver 815. The wireless device 801 may also include (not shown) multiple transmitters, multiple receivers, multiple transceivers and/or multiple antenna.

The various components of the wireless device 801 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 4, 6 and 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for service flow retention in a wireless communication system, the method being implemented by a subscriber station, the method comprising:
    determining whether to retain a service flow between the subscriber station and a base station during an idle mode of the subscriber station, wherein the determining is based on a data demand metric, and wherein the data demand metric indicates the likelihood that data demand for the service flow will resume within a particular amount of time;
    reactivating the service flow when the subscriber station exits the idle mode;
    monitoring whether the service flow has data activity; and
    deleting the service flow if there is no data activity.

2. The method of claim 1, further comprising storing information about the service flow before the subscriber station enters the idle mode.

3. The method of claim 1, wherein the determining whether to retain the service flow comprises:
    adding a new parameter to the service flow that indicates whether the service flow should be retained; and
    determining whether to retain the service flow based on the new parameter.

4. The method of claim 1, wherein the reactivating the service flow comprises:
- sending, to the base station, a request that the base station verify that there is enough available bandwidth to support the service flow;
- receiving a response from the base station based on the request;
- changing a set type Quality of Service (QoS) parameter of the service flow to admitted and active if the response indicates there is enough available bandwidth; and
- changing the set type QoS parameter of the service flow to provisioned if the response indicates there is not enough available bandwidth.

5. The method of claim 1, wherein the reactivating the service flow comprises:
- sending, to the base station, a request that the base station verify that there is enough available bandwidth to support the service flow;
- receiving a response from the base station based on the request; and
- changing a set type Quality of Service (QoS) parameter of the service flow to provisioned even if the response indicates there is enough available bandwidth.

6. The method of claim 1, wherein the reactivating the service flow comprises renegotiating service flow activation or deactivation with the base station if there is not enough available bandwidth for the service flow.

7. The method of claim 1, wherein the monitoring whether the service flow has data activity comprises:
- initializing a counter when the service flow is created;
- incrementing the counter when the service flow has no data transmissions during a normal mode;
- resetting the counter when the service flow has a data transmission during the normal mode; and
- identifying the service flow as not having data activity if the counter exceeds a threshold value.

8. The method of claim 1, wherein the monitoring whether the service flow has data activity comprises:
- initializing a timer to zero when the service flow is created;
- allowing the timer to run until there is a data transmission;
- resetting the timer when the data transmission occurs; and
- identifying the service flow as not having data activity if the timer exceeds a threshold value.

9. A subscriber station for service flow retention in a wireless communication system, comprising:
- a processor;
- memory in electronic communication with the processor; and
- instructions stored in the memory, the instructions being executable by the processor to:
  - determine whether to retain a service flow between the subscriber station and a base station during an idle mode of the subscriber station, wherein the determining whether to retain the service flow is based on a data demand metric, and wherein the data demand metric indicates the likelihood that data demand for the service flow will resume within a particular amount of time;
  - reactivate the service flow when the subscriber station exits the idle mode;
  - monitor whether the service flow has data activity; and
  - delete the service flow if there is no data activity.

10. The subscriber station of claim 9, wherein the instructions are also executable to store information about the service flow before the subscriber station enters the idle mode.

11. The subscriber station of claim 9, wherein the determining whether to retain the service flow comprises:
- adding a new parameter to the service flow that indicates whether the service flow should be retained; and
- determining whether to retain the service flow based on the new parameter.

12. The subscriber station of claim 9, wherein the reactivating the service flow comprises:
- sending, to the base station, a request that the base station verify that there is enough available bandwidth to support the service flow;
- receiving a response from the base station based on the request;
- changing a set type Quality of Service (QoS) parameter of the service flow to admitted and active if the response indicates there is enough available bandwidth; and
- changing the set type QoS parameter of the service flow to provisioned if the response indicates there is not enough available bandwidth.

13. The subscriber station of claim 9, wherein the reactivating of the service flow comprises:
- sending to the base station a request that the base station verify that there is enough available bandwidth to support the service flow;
- receiving a response from the base station based on the request; and
- changing a set type Quality of Service (QoS) parameter of the service flow to provisioned even if the response indicates there is enough available bandwidth.

14. The subscriber station of claim 9, wherein the reactivating the service flow comprises renegotiating service flow activation or deactivation with the base station if there is not enough available bandwidth for the service flow.

15. The subscriber station of claim 9, wherein the monitoring whether the service flow has data activity comprises:
- initializing a counter when the service flow is created;
- incrementing the counter when the service flow has no data transmissions during a normal mode;
- resetting the counter when the service flow has a data transmission during the normal mode; and
- identifying the service flow as not having data activity if the counter exceeds a threshold value.

16. The subscriber station of claim 9, wherein the monitoring whether the service flow has data activity comprises:
- initializing a timer to zero when the service flow is created;
- allowing the timer to run until there is a data transmission;
- resetting the timer when the data transmission occurs; and
- identifying the service flow as not having data activity if the timer exceeds a threshold value.

17. A subscriber station for service flow retention in a wireless communication system, comprising:
- means for determining whether to retain a service flow between the subscriber station and a base station during an idle mode of the subscriber station, wherein determining whether to retain the service flow is based on a data demand metric, and wherein the data demand metric indicates the likelihood that data demand for the service flow will resume within a particular amount of time;
- means for reactivating the service flow when the subscriber station exits the idle mode;
- means for monitoring whether the service flow has data activity; and
- means for deleting the service flow if there is no data activity.

18. The subscriber station of claim 17, further comprising means for storing information about the service flow before the subscriber station enters the idle mode.

19. The subscriber station of claim 17, wherein the means for determining whether the service flow is retained comprises:
    means for adding a new parameter to the service flow that indicates whether the service flow should be retained; and
    means for determining whether to retain the service flow based on the new parameter.

20. The subscriber station of claim 17, wherein the means for reactivating the service flow comprises:
    means for sending, to the base station, a request that the base station verify that there is enough available bandwidth to support the service flow;
    means for receiving a response from the base station based on the request;
    means for changing a set type Quality of Service (QoS) parameter of the service flow to admitted and active if the response indicates there is enough available bandwidth; and
    means for changing the set type QoS parameter of the service flow to provisioned if the response indicates there is not enough available bandwidth.

21. The subscriber station of claim 17, wherein the means for reactivating the service flow comprises:
    means for sending, to the base station, a request that the base station verify that there is enough available bandwidth to support the service flow;
    means for receiving a response from the base station based on the request; and
    means for changing a set type Quality of Service (QoS) parameter of the service flow to provisioned even if the response indicates there is enough available bandwidth.

22. The subscriber station of claim 17, wherein the means for reactivating the service flow comprises renegotiating service flow activation or deactivation with the base station if there is not enough available bandwidth for the service flow.

23. The subscriber station of claim 17, wherein the means for monitoring whether the service flow has data activity comprises:
    means for initializing a counter when the service flow is created;
    means for incrementing the counter when the service flow has no data transmissions during a normal mode;
    means for resetting the counter when the service flow has a data transmission during the normal mode; and
    means for identifying the service flow as not having data activity if the counter exceeds a threshold value.

24. The subscriber station of claim 17, wherein the means for monitoring whether the service flow has data activity comprises:
    means for initializing a timer to zero when the service flow is created;
    means for allowing the timer to run until there is a data transmission;
    means for resetting the timer when the data transmission occurs; and
    means for identifying the service flow as not having data activity if the timer exceeds a threshold value.

25. A computer-program product for service flow retention in a wireless communication system, the computer-program product comprising a non-transitory computer-readable medium having instructions thereon, the instructions comprising:
    code for determining whether to retain a service flow between the subscriber station and a base station during an idle mode of the subscriber station, wherein determining whether to retain the service flow is based on a data demand metric, and wherein the data demand metric indicates the likelihood that data demand for the service flow will resume within a particular amount of time;
    code for reactivating the service flow when the subscriber station exits the idle mode;
    code for monitoring whether the service flow has data activity; and
    code for deleting the service flow if there is no data activity.

* * * * *